Feb. 16, 1932.  A. KNETZGER  1,845,880
CLARINET
Filed March 14, 1929
Fig.1.
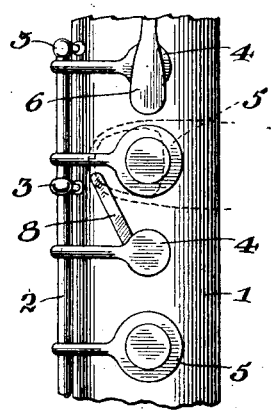
Fig.2.
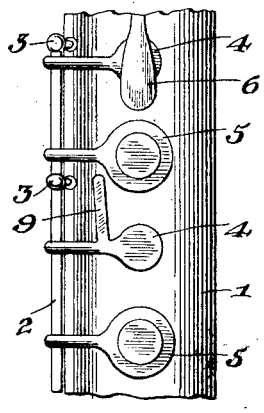
Fig.3.
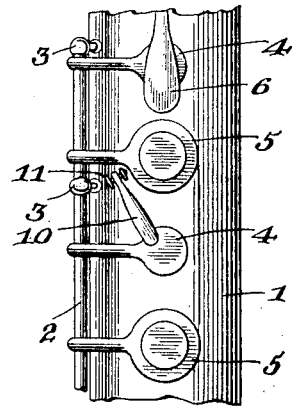
Fig.4.
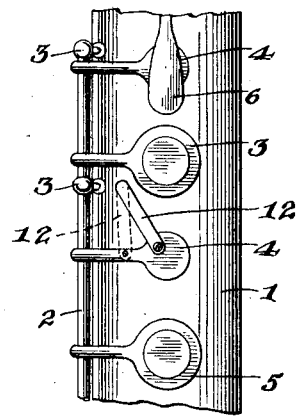
Fig.5.
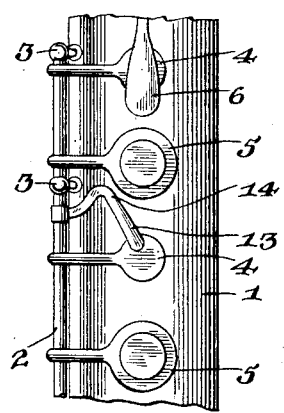
Fig.6.
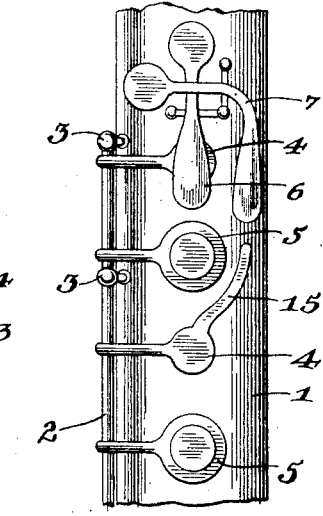
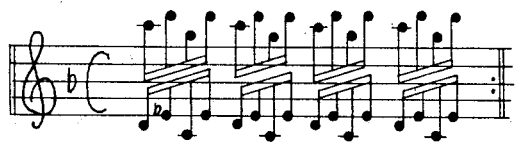
Fig.7
Inventor
August Knetzger
By Albert F. Jacobs
Attorney Patented Feb. 16, 1932

1,845,880

UNITED STATES PATENT OFFICE

AUGUST KNETZGER, OF ST. LOUIS, MISSOURI

CLARINET

Application filed March 14, 1929. Serial No. 346,901.

This invention relates to clarinets and concerns more especially an attachment to the hole cover on the upper joint of the Boehm clarinet whereby the musician is enabled to play the notes B♭ E♭ with a single finger without the aid of any other key or finger.

Previously known clarinets require two or sometimes three fingers to produce these notes B♭ E♭ which have heretofore been produced by placing on their respective holes the index and second fingers of the left hand and opening the cross key; by placing the index and second fingers of the left hand on their respective holes and opening the side key; by placing the index finger of the left hand and the index finger of the right hand upon their respective holes; or by placing the index finger of the left hand and the second finger of the right hand upon their respective holes.

One of the objects of my invention is to simplify and facilitate the production of the notes B♭ E♭ and to eliminate extensive practice and difficult manipulation.

Another object of my invention is to enable a musician to play in flat keys and in any combination of notes in said flat keys with great assurance and simple technique and to produce two notes with a single finger.

A further object of my invention is the provision of an attachment yielding the above results to a hitherto unattainable degree.

Other objects and advantages will either be apparent as the description proceeds or will be hereinafter pointed out.

There are several simple but analogous ways of carrying out the objects of my invention and reference to a number will be made in connection with the accompanying drawings wherein:

Figure 1 is a fragmentary portion of the upper joint of a clarinet embodying my invention;

Figure 2 is a similar view of a modified form;

Figure 3 is a similar view of another modification;

Figure 4 illustrates a further modification;

Figure 5 is a modification of a somewhat different type;

Figure 6 is an additional modified form; and

Figure 7 is an illustration of a passage of music which can be surely and effectively played on an instrument embodying my invention.

Similar numerals designate similar parts throughout the several views.

Referring now to the drawings, it will be seen that my invention includes a lever or lever arm or suitable attachment which may take a variety of forms and be attached in a number of ways and positions. For example, the lever may be soldered or screwed to the hole cover of a clarinet or to any portion of which said hole cover is a part or it may be flanged or pivoted to the body of the clarinet or to any suitable part thereof, in either case in such a manner and position that the mere downward movement of the tip of the index finger of the left hand will touch the lever and thereby close the hole cover, the index finger itself retaining full and easy control of the superjacent key as will be hereinafter pointed out more specifically.

The numeral 1 designates a portion of the body of a clarinet, preferably the Boehm clarinet, and the portion illustrated is the so-called upper joint. The usual rotating rod is designated by numeral 2, and 3, 3 are the standards between which the action parts rotate. The usual hole covers and rings are shown at 4 and 5 respectively and are connected to rod 2 in the usual manner. Keys 6 and 7 are conventional in a clarinet of this type.

In Figure 1, the lever 8 is soldered or otherwise secured to the hole cover 4 either to its upper or lower surface thereof or to its side. It is clear that lever 8 and key 4 can be made integral if desired.

In Figure 2, the lever 9 is secured to the stem of key 4 in any of the manners of lever 8. Whereas lever 8 is oblique and has its end in close proximity to ring 5, the same result is secured by lever 9 which is, however, substantially parallel to the axis of the instrument.

In Figure 3, lever 10 is pivoted, flanged, or swiveled, as at 11, to the body portion 1 of the clarinet. This gives an effect as in Figure 1 of the oblique lever but it is secured at the opposite end. As is clear from the drawings, the lower end of lever 10 overlies a portion of hole cover 4 so that actuation of lever 10 closes said key 4.

In Figure 4, lever 12 is screwed or otherwise secured to the hole cover 4 either to the key itself, as shown in full line position, or to the stem of the key, as shown in dotted line position. This form permits desired adjustment, in addition, as the exact position of the lever can be varied such as by temporarily loosening the screw.

In Figure 5, a somewhat different type of lever is shown wherein lever 13 is connected to and rotates with rod 2 at one end and at the other end partially overlies hole cover 4. Intermediate the ends is a hump 14 thus bringing a portion of the lever adjacent ring 5 whereby the purposes of this invention may be attained.

Figure 6 represents a form of the invention wherein the lever 15 is so attached as to be taken with the first finger on the reverse side.

I have thus shown several forms of an attachment whereby the notes B♭ E♭ may be produced with one finger alone while still retaining control of the superjacent key 6. In operation, as shown by the representation of a finger (the first or index finger of the left hand), the ring 5 may be played and whenever desired or required, the lever 8, 9, 10, 12, 13, or 15 may simultaneously be played by a slight forward and downward movement, control of key 6 being nevertheless retained due to the propinquity and arrangement of the several parts.

I find that many difficult passages can be played on an instrument provided with my attachment with greater ease and better technique and that much tiresome practice can be eliminated. Moreover, some passages are impossible of execution except on an instrument with my attachment. The passage of music shown in Fig. 7 is one such which is sure and effective when played on an instrument embodying my invention.

It is clear that this invention is not limited to clarinets nor to the upper joint thereof but may be effectively utilized wherever the principles herein enumerated find application.

All the above is intended to be more illustrative than limitative so that I do not limit myself thereto except as contained in the subjoined claims.

Having thus illustrated my invention and described its use what I claim as new and desire to secure by Letters Patent of the United States is:

1. An attachment for the hole cover of the upper joint of a clarinet comprising a lever in operative relation to said hole cover so constructed and arranged that a light pressure of the tip of the index finger of the musician upon said lever will close said hole cover, whereby the musician is enabled to produce the notes B♭ E♭ with said finger alone.

2. An attachment for the hole cover of the upper joint of a clarinet comprising a lever in operative relation to said hole cover so constructed and arranged that a light downward pressure of the tip of the index finger which is playing the next adjacent ring key produces operation of said hole cover, thereby enabling the musician to produce the notes B♭ E♭ with said index finger alone.

3. An attachment for the hole cover of the upper joint of a clarinet comprising a lever in operative relation to said hole cover so constructed and arranged that a light downward pressure of the tip of the index finger of the left hand which is playing the ring key next above produces operation of said hole cover, thereby enabling the musician to produce the notes B♭ E♭ with said index finger of said hand alone.

4. An attachment for the hole cover of the upper joint of a clarinet comprising a lever in operative relation to said hole cover so constructed and arranged that a light downward pressure of the tip of the index finger of the left hand which is playing the ring key next above produces operation of said hole cover, thereby enabling the musician to produce the notes B♭ E♭ with said index finger of said hand alone while still retaining control of the superjacent key.

5. In a clarinet, a hole cover, a ring key, and means on said hole cover for playing said hole cover and ring key with one finger.

6. In a clarinet, a hole cover, a ring key, and means for playing said hole cover and ring key with the index finger of the left hand, said means including a lever on said hole cover and having a portion adjacent said ring key.

7. In a clarinet, a hole cover, a ring key, and means for operating said hole cover and ring key both with the index finger alone of the left hand, said means including a lever on said hole cover so constructed and arranged that a portion of said lever is brought into close proximity to said ring key.

8. In a clarinet, a hole cover, a ring key, and a lever in operative association with both said hole cover and said ring key so constructed and arranged that a slight forward and downward movement of the tip of the index finger of the left hand of the musician enables the latter to produce the notes B♭ E♭ by said index finger alone.

In testimony whereof I hereunto set my hand this 11 day of March, 1929.

AUGUST KNETZGER.